Patented Sept. 3, 1946

2,407,003

UNITED STATES PATENT OFFICE 2,407,003

EMULSIFYING AGENTS PRODUCED FROM GLYCOL GLUCOSIDES AND PROCESS FOR THEIR PRODUCTION

William C. Griffin, Newport, Del., assignor to Atlas Powder Company, Wilmington, Del., a corporation of Delaware No Drawing. Application October 30, 1944, Serial No. 561,156

10 Claims. (Cl. 260—210)

1

The present invention relates to emulsifying agents produced from glycol glucosides and process for their production.

An object of the invention is to provide a process for making compositions having valuable emulsifying properties from glycol glucosides.

Another object is to provide a novel class of materials having valuable emulsifying properties.

A particular object relates to a process for making compositions having emulsifying properties from propylene glycol glucosides, and to the product of the process.

The above and other objects will become apparent in the course of the following description and claims.

In my co-pending application, Ser. No. 559,843, filed October 21, 1944, entitled "Sugar derivatives," I have disclosed, among other materials, a class of oxyalkylene derivatives of glycol glucosides which can be esterified with organic acids. To prepare these products, sugars with from 5 to 6 carbon atoms are reacted with certain glycols or glycol ethers in the presence of a strong mineral acid catalyst in two successive states; first, a reaction under conditions preventing escape of volatile materials which reaction is carried out to substantial equilibrium; and secondly, reaction under conditions permitting or promoting the escape of volatile materials which reaction is conducted again to substantial equilibrium. The glucoside composition so prepared is then reacted with an oxyalkylating agent in the ratio of at least 4 molecular weight equivalents of the oxyalkylating agent for each calculated mol of the glucoside. For this purpose, the average molecular weight of the glucoside is assumed to be the molecular weight of the simple glycol glucoside. In my said application I have disclosed that these oxyalkylene ethers are susceptible to direct esterification with organic acids by conventional high temperature esterification methods.

The present invention relates to a specific class of esters of the general type disclosed in my earlier application. It has been found that compositions with remarkable emulsifying power are obtainable in a certain group of the esters of the oxyethylene ethers of glycol glucosides. As the glycol glucoside there may be used any of the glucosides described in my above identified application, but preferably the propylene glycol glucoside obtained from glucose is used. Then the glucoside is reacted with ethylene oxide or other oxyethylating agent, in the proportion of 4 to 12 equivalents of ethylene oxide to each calculated molecular weight of the glucoside. In this range and with propylene glycol glucoside from glucose outstanding results are obtained with the product produced by the reaction of 6 mols of ethylene oxide per calculated mol of the glucoside. The oxyethylene ether is then reacted with oleic acid in proportions of from 4 to 5 mols of the acid for each calculated mol of the oxyethylene ether. As the acid, I can use oleic acid, or the acids obtained by hydrolysis of cottonseed, corn, soya bean, or other vegetable oil.

The outstanding product of the class described is that produced by the reaction of substantially 4.5 mols of the oleic acid on the product of the reaction of 6 mols of ethylene oxide and one mol of propylene glycol glucoside from glucose. In tests of emulsifying power, this preferred product gives a water absorption value of the order of 2500.

As described in my above identified application, the glucoside is prepared as follows:

The sugars that are used are the 5 to 6 carbon atom sugars such as glucose, fructose, galactose, inverted sucrose, and xylose. Glucose is the preferred sugar. The glycols that are used are the simple glycols with 2 to 3 carbon atoms or the dihydric inter ethers thereof with not more than 6 carbon atoms. Suitable glycols are ethylene glycol, di-ethylene glycol, tri-ethylene glycol, propylene glycols, di-propylene glycols, and hydroxy ethylene ethers of propylene glycols. Suitable strong mineral acid catalysts are sulfuric acid, hydrochloric acid, iodine (which forms iodine acids in the reaction), and aryl sulfonic acids. Sulfuric acid and iodine are the preferred catalysts.

The sugar and glycol or glycol ether are mixed in approximately mol for mol ratio, a small excess of the glycol or glycol ether being desirable. A small amount, for example 0.03 to 0.2% of the catalyst is added, suitably after the reactants have been heated to form a clear solution. The first step of the reaction is performed either under reflux or in a closed container to prevent loss of volatiles. The reactants are heated together preferably to a temperature of 100° to 140° C. during the first step. The duration of the reaction depends upon the time required to reach equilibrium. In the case of glucose and propylene or diethylene glycol about 9 to 15% reducing bodies, calculated as glucose, remain at equilibrium.

The second step of the process consists in continuing the reaction under conditions permitting the escape of volatiles. This phase of the process can be conducted by heating the product of the first step in an open vessel freely permitting the escape of volatile materials. It is desirable, however, to conduct the heating under conditions actively promoting the escape of volatile materials. Thus the reactants can be held under vacuum during the heating and/or a gas can be jetted through the reactants during the heating. The temperature of the reaction mixture during this time should be sufficiently high to remove the volatile materials, but not high enough to cause decomposition. In general, temperatures of 100° to 140° C. are to be preferred. Heating is continued until equilibrium is substantially attained. At the point of equilibrium these compositions contain not over 5% of sugar and generally less than 3% of sugar. They have viscosities of the order of 15,000 centipoises or higher at 85% concentration in water at 25° C.

The oxyethylene ethers of these compositions are preferably made by reacting the glucoside with ethylene oxide in an autoclave at an elevated temperature preferably not exceeding about 140° C. Reaction proceeds by the addition of ethylene oxide to hydroxyl groups producing oxyethylene ethers. The ethylene oxide combines not only with the hydroxyl groups of the glucoside composition, but also with the hydroxyl groups of the oxyethylene ethers producing polyoxyethylene ether chains. In order to obtain the products of this invention at least 4 mols of ethylene oxide must be reacted with each mol of the glucoside composition. The upper limit of the amount of ethylene oxide is about 12 mols per mol of the glucoside composition. The preferred products as before stated are produced by the reaction of 6 mols of ethylene oxide per mol of the glucoside composition. Instead of ethylene oxide, I may use other oxyethylating agents such as glycol chlorhydrin, or ethylene glycol.

The esters of the oxyethylene ethers are then produced by reacting oleic acid with the ether in the ratio of from 4 to 5 mols of the acid per mol of the oxyethylene ether. Reaction is performed at about 200° C. The ester may be treated with a decolorizing agent such as activated carbon or it may be bleached as with hydrogen peroxide or a combination of these two treatments may be employed. The esters are light colored liquids which are very useful in cosmetic, pharmaceutical, and other emulsions.

The following examples illustrate typical processes and compositions according to the invention.

EXAMPLE I (A)

158.5 pounds propylene glycol were introduced into a reaction vessel operating under total reflux and heated to 90° C. Then 341.5 pounds of glucose (anhydrous) were introduced and the mixture was heated gradually to 122° C. at which time 113 grams iodine were added as catalyst. The catalyst was added at 2.1 hours after the introduction of the glucose. The reaction mixture was heated at about 122° C. for 1.9 hours more under refluxing conditions and then for 6 hours under reduced pressure of 27 inches of vacuum.

The product was a highly viscous water-soluble hygroscopic liquid containing 1.2% reducing sugar.

(B)

776 pounds of a product produced as in part (A) were introduced into an autoclave together with 13 pounds sodium oleate which acts as catalyst. The mixture was heated to 235° F. at which time ethylene oxide was gradually introduced to maintain a pressure of about 40 pounds per square inch. The temperature was slowly raised to 250° F. during the run and a total of 862 pounds ethylene oxide was introduced gradually at approximately the rate at which it reacted. The temperature was maintained at 250° F. until the pressure in the autoclave dropped to normal.

The product of this reaction was a mixture of hydroxyethylene ethers of the product of process (A). The proportions were calculated to give an average of 6 oxyethylene groups per mol of propylene glycol glucoside, the product of process (A) being assumed for purposes of calculation to have the average molecular weight of propylene glycol glucoside.

(C)

167.3 parts by weight of the product of process (B) were reacted with 423 parts by weight of oleic acid at 200° C. for 4½ hours. No additional catalyst was added. At the end of the first four hours of the reaction, activated carbon ("Darco G-60") was added in the proportion of 2% of the charge weight. At the end of the reaction the activated carbon was removed by filtering. The filtrate was allowed to cool to 100° to 105° C. and was then bleached with hydrogen peroxide.

In the foregoing example, the molecular weight of propylene glycol glucoside was taken to be 238 which is the weight of the simple propylene glycol glucoside. The molecular weight of the oxyethylene ether produced by adding 6 mols of ethylene oxide to the propylene glycol glucoside was taken to be 502. On this basis the final product was an ester containing an average of 4.5 mols of oleic acid per mol of the oxyethylene ether of the propylene glycol glucoside.

(D)

10 grams of the ester produced according to process (C) were dissolved in 90 grams of cosmetic grade petrolatum. A water absorption test was made by adding water to this mixture while stirring. The temperature of the mixture and of the water was from 50° to 55° C. In this test the mixture of ester and petrolatum absorbed 2500 grams of water to form a stable water-in-oil emulsion.

EXAMPLE II 167.3 parts by weight of an oxyethylene ether produced as in Example I (B) were placed in a reaction vessel and 0.1 part of iodine added. The mixture was then heated to about 140° C. and held there for 15 minutes to stabilize the oxyethylene ether. Then 423 parts of a commercial mixture of the fatty acids of corn and soya bean oils were added and the temperature raised to 200° C. and held at that value for 4½ hours. During the last half hour a charge of activated carbon ("Darco G-60") equal in weight to 2% of the total charge weight was added. At the end of the reaction the activated carbon was removed by filtering. The filtrate was allowed to cool to 100° to 105° C. and then bleached with hydrogen peroxide.

The proportions in this example were calculated on the same basis as Example I (C) and the product is an ester containing an average of 4.5 acid groups (predominantly oleic acid) per mol of the oxyethylene ether.

A water absorption value of 2400 was obtained in a test similar to that reported in Example I (D).

EXAMPLE III

Cottonseed oil fatty acid foots were substituted for the fatty acid in Example II, the process being otherwise repeated.

The product of this process, which was also an ester having an average of 4.5 fatty acid groups (predominantly oleic acid) per mol of the oxyethylene ether, had a water absorption value of 2400 in a test similar to that reported in Example I (D).

EXAMPLE IV

Example I (C) was repeated using, however, 404.2 parts of oleic acid instead of 423 parts. The product was an ester with an average of 4.3 oleic acid groups per mol of oxyethylene ether. The water absorption value of this product, by the test reported in Example I (D), was 2230.

EXAMPLE V

Example I (C) was repeated using 441.8 parts of oleic acid instead of 423 parts. The product was an ester with an average of 4.7 oleic acid groups per mol of oxyethylene ether. The water absorption value of this product by the test reported in Example I (D) was 2230.

The processes and products of my invention defined in the appended claims, are subject to various modifications which will now be apparent to others skilled in this art.

I claim:

1. The process which comprises heating a sugar containing from 5 to 6 carbon atoms with a dihydric compound of the class consisting of glycols with 2 to 3 carbon atoms and the dihydric inter-ethers of said glycols with not more than 6 carbon atoms, in substantially equimolecular proportions, in the presence of a strong mineral acid catalyst, and under conditions in which volatile reactants and volatile reaction products are retained in the reaction mixture, until an equilibrium is substantially attained; continuing the heating of the reaction mixture under conditions permitting the escape of volatile materials until the product contains not more than about 5% reducing bodies; reacting the last said product with an oxyethylating compound in the ratio of 1 mol of said product to from 4 to 12 mols of the oxyethylating compound to form an oxyethylene ether; and reacting said oxyethylene ether with from 4 to 5 molecular equivalents of oleic acid.

2. The process which comprises heating glucose with a dihydric compound of the class consisting of glycols with 2 to 3 carbon atoms and the dihydric inter-ethers of said glycols with not more than 6 carbon atoms, in substantially equimolecular proportions, in the presence of a strong mineral acid catalyst, and under conditions in which volatile reactants and volatile reaction products are retained in the reaction mixture, until an equilibrium is substantially attained; continuing the heating of the reaction mixture under conditions permitting the escape of volatile materials until the product contains not more than about 5% reducing bodies; reacting the last said product with an oxyethylating compound in the ratio of 1 mol of said product to from 4 to 12 mols of the oxyethylating compound to form an oxyethylene ether; and reacting said oxyethylene ether with from 4 to 5 molecular equivalents of oleic acid.

3. The process which comprises heating glucose with propylene glycol, in substantially equimolecular proportions, in the presence of a strong mineral acid catalyst, and under conditions in which volatile reactants and volatile reaction products are retained in the reaction mixture until an equilibrium is substantially attained; continuing the heating of the reaction mixture under conditions permitting the escape of volatile materials until the product contains not more than about 5% reducing bodies; reacting the last said product with ethylene oxide in the ratio of about 1 mol of said product to from 4 to 12 mols of ethylene oxide to form an oxyethylene ether; and reacting said oxyethylene ether with from 4 to 5 molecular equivalents of oleic acid.

4. The process which comprises heating glucose with propylene glycol, in substantially equimolecular proportions, in the presence of a strong mineral acid catalyst, and under conditions in which volatile reactants and volatile reaction products are retained in the reaction mixture, until an equilibrium is substantially attained; continuing the heating of the reaction mixture under conditions permitting the escape of volatile materials until the product contains not more than about 5% reducing bodies; reacting the last said product with ethylene oxide in the ratio of about 1 mol of said product to 6 mols of ethylene oxide to form an oxyethylene ether; and reacting said oxyethylene ether with from 4 to 5 molecular equivalents of oleic acid.

5. The process which comprises heating glucose and propylene glycol in substantially equimolecular proportions, in the presence of a strong mineral acid catalyst, and under conditions in which volatile reactants and volatile reaction products are retained in the reaction mixture, until an equilibrium is substantially attained; continuing the heating of the reaction mixture under conditions permitting the escape of volatile materials until the product contains not more than about 5% reducing bodies; reacting the last said product with ethylene oxide in the ratio of about one mol of said product to six mols of ethylene oxide to form an oxyethylene ether; and reacting said oxyethylene ether with oleic acid in the ratio of about one mol of the oxyethylene ether to 4.5 mols of oleic acid.

6. The product produced by the process of claim 1.

7. The product produced by the process of claim 2.

8. The product produced by the process of claim 3.

9. The product produced by the process of claim 4.

10. The product produced by the process of claim 5.

WILLIAM C. GRIFFIN.